United States Patent [19]

Baggett et al.

[11] 4,100,139

[45] Jul. 11, 1978

[54] POLYCARBONATES INCORPORATING EPIHALOHYDRIN RESIDUES

[75] Inventors: Joseph McClendon Baggett, Freeport; Ruben Louis Krause, Angleton, both of Tex.

[73] Assignee: The Dow Chemical Company, Midland, Mich.

[21] Appl. No.: 638,393

[22] Filed: Dec. 8, 1975

Related U.S. Application Data

[63] Continuation-in-part of Ser. No. 374,858, Jun. 29, 1973, abandoned.

[51] Int. Cl.$^2$ .............................................. C08G 63/62
[52] U.S. Cl. ..................................... 528/196; 528/104
[58] Field of Search ............................ 260/47 XA, 49

[56] References Cited

U.S. PATENT DOCUMENTS

| | | | |
|---|---|---|---|
| 3,141,863 | 7/1964 | Holm | 260/47 XA |
| 3,248,416 | 4/1966 | Stevens | 260/47 XA |
| 3,875,112 | 4/1975 | Bockman et al. | 260/47 XA |

FOREIGN PATENT DOCUMENTS

| | | | |
|---|---|---|---|
| 271,840 | 5/1963 | Australia | 260/47 XA |
| 2,119,775 | 11/1972 | Fed. Rep. of Germany | 260/47 XA |
| 942,538 | 11/1963 | United Kingdom | 260/47 XA |
| 885,442 | 12/1961 | United Kingdom | 260/47 XA |

*Primary Examiner*—Theodore E. Pertilla
*Attorney, Agent, or Firm*—B. G. Colley

[57] ABSTRACT

A thermoplastic polycarbonate formed by reacting a carbonate precursor such as phosgene, a dihydric phenol, and an epihalohydrin-dihydric phenol prepolymer under polycarbonate forming conditions.

7 Claims, No Drawings

POLYCARBONATES INCORPORATING EPIHALOHYDRIN RESIDUES

CROSS-REFERENCE TO RELATED APPLICATIONS

This application is a continuation-in-part of Ser. No. 374,858 filed Jun. 29, 1973 now abandoned.

BACKGROUND OF THE INVENTION

This invention relates to copolycarbonates having an epihalohydrin residue incorporated therein and a process for making the polycarbonates.

It is known from U.S. Pat. No. 3,875,112 to make polycarbonate copolymers by coreacting 2,2-bishydroxy phenyl propane with phosgene and the glycerine bis ether of bisphenol A. However, these copolymers are disclosed to be reactive polyols useful to make polyester carbonates, polyether carbonates and polyurethane carbonates. They are not useful high molecular weight thermoplastic polycarbonates.

SUMMARY OF THE INVENTION

It now has been discovered that random copolycarbonates can be prepared from a dihydric phenol, a carbonate precursor, and epihalohydrin-dihydric phenol precursor and these copolycarbonates are similar in physical properties to the known bisphenol polycarbonates, i.e., U.S. Pat. No. 3,028,365, but the present polycarbonates are superior in that they have a lower molding temperature, or a lower torque requirement when melted and mixed at the same temperature and they have less moisture absorption. This is most unexpected since the present thermoplastic copolymer has free aliphatic hydroxyl groups on the polymer chains which one would expect to give crosslinking and thermosetting characteristics.

It is well known that during the molding of the conventional aromatic polycarbonate resins excessive moisture causes chemical degradation of the resin as the melt temperatures are reached. The present invention alleviates this problem to a great extent by providing a more moisture resistant resin which requires less drying time prior to processing. In addition, a lower melting temperature is provided with the present invention with the attendant lower power requirements.

The present polycarbonates are superior to those of U.S. Pat. No. 3,875,112 in that these polycarbonates are oligimers having a degree of polymerization of about 5. Thus, they do not provide the art with a tough moldable or thermoplastic polycarbonate.

The present invention is broadly the linear thermoplastic polycarbonate which comprises the reaction product under polycarbonate forming conditions of a carbonate precursor, a dihydric phenol and about 50 to about 2 mole percent of a hydroxyl compound having the formula

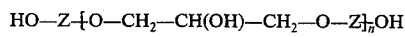

wherein Z is the divalent residue from a dihydric phenol and $n$ is a number having an average value from 1 to 5, wherein the polycarbonate has a weight average molecular weight greater than about 25,000 as determined by gel permeation chromatography.

Preferably, the molecular weight range as measured by GPC (gel permeation chromatography) is from about 30,000 to about 160,000 with the range from about 33,000 to about 50,000 being the most preferred.

A particularly preferred polycarbonate has about 70 to about 90 mole percent dihydric phenol with the remainder being about 30 to about 10 mole percent of the above hydroxy compound.

A more preferred aspect of the present invention is a polycarbonate which is the reaction product under polycarbonate forming conditions of phosgene, a dihydroxy compound of the formula HO—Z—OH and a compound of the formula

wherein Z is the divalent group

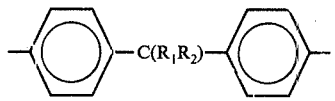

and $R_1$ and $R_2$ are independently hydrogen and lower alkyls such as methyl, ethyl, propyl, butyl and $n$ is a whole number from one to five.

The process by which the polycarbonates of this invention are prepared consists of forming a prepolymer from one mole of a dihydric phenol with about 0.03 to about 0.5 moles of an epihalohydrin such as epichlorohydrin or epibromohydrin in an aqueous caustic solution. This prepolymer is then reacted with additional amounts of the same or a different dihydric phenol and a carbonate precursor under polycarbonate forming conditions such as interfacial polycondensation to produce a linear thermoplastic polycarbonate.

These polycarbonate resins are useful in that they can be injection molded and extruded into useful objects by conventional methods.

DETAILED DESCRIPTION

The polycarbonates produced in this invention are produced by first reacting and stirring a dihydric phenol compound such as bisphenol A with an aqueous caustic solution made from sodium or potassium hydroxide having a pH greater than 10 at a temperature in the range from about 10 to about 60° C for a period of time ranging from about 0.5 to about 3.0 hours in an inert atmosphere such as nitrogen, carbon dioxide and the like.

Following this, an epihalohydrin such as epichlorohydrin or epibromohydrin is added in an amount from 0.03 to 0.50 moles per mole of dihydric phenol with continued stirring and allowed to react for a period of time from about 30 to about 600 minutes at the same temperature to form an epihalohydrin adduct.

In order to control the molecular weight of the polycarbonate which is to be formed, about 1.5 to 5.0 grams of a chain stopper such as phenol or an alkylated phenol is added to the reactants at this point and reacted for about 15 to about 60 minutes at about 15° to about 50° C in order to form the sodium salt thereof.

An inert halogenated solvent such as methylene chloride, and the like is then added to the reactants in an amount from 5.5 to 8.3 moles and stirred for about 15 to about 45 minutes at about 15° to about 40° C.

Then 0.81 to 1.2 moles of a carbonate precursor, based on the total moles of dihydric phenol and epihalohydrin adduct, are bubbled into the reactants at a rate of 0.5 to 3 grams per minute and the reaction temperature is maintained in the range from about 20° to about 30° C by a cold water bath.

Additional caustic is added periodically during the phosgenation reaction to keep the pH in excess of pH 10.0.

After the addition of the phosgene is complete, the water bath is removed and a catalytic quantity, i.e., 1-5 weight percent based on the dihydric phenol of a quaternary amine or a tertiary amine catalyst is added to the reactants. Suitable catalysts are trialkyl amines such as triethylamine, N,N-dimethylcyclohexylamine, tetramethyl ammonium hydroxide, triethyl benzyl ammonium hydroxide, and the like. The catalyzed reactants are stirred and allowed to react for about 30 minutes to about 3 hours at a temperature of about 20° to about 30° C.

The recovery of the polycarbonate is accomplished by decanting the aqueous layer, treating the remaining halogenated solvent with a strong aqueous acid solution (pH 1-3) such as hydrochloric or sulfuric acid solutions, to neutralize the NaOH or KOH and washing with distilled water.

Finally, the polymer is precipitated from the solvent solution by pouring it into an excess of a non-solvent for the polymer such as hexane, ethanol, petroleum ether, etc. The white precipitated polymer is then filtered, water washed and dried in a vacuum.

The dihydric phenols employed in the practice of this invention are dihydric phenols in which the sole reactive groups are the two phenolic hydroxyl groups. One group of suitable dihydric phenols are those illustrated below 1,1-bis(4-hydroxyphenyl)-1-phenyl ethane
1,1-bis(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3-ethyl-4-hydroxphenyl)octane
4,4-bis(4-hydroxphenyl)heptane
3,3-bis(3-methyl-4-hydroxyphenyl)hexane
3,3-bis(3,5-dibromo-4-hydroxyphenyl)pentane
2,2-bis(3,5-difluoro-4-hydroxphenyl)butane
2,2-bis(4-hydroxyphenyl)propane
1,1-bis(3-methyl-4-hydroxyphenyl)ethane
1,1-bis(4-hydroxyphenyl)methane.

Another group of dihydric phenols useful in the practice of the present invention include the dihydroxyl diphenyl sulfoxides such as for example:

bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide.

Another group of dihydric phenols which may be used in the practice of the invention includes the dihydroxaryl sulfones such as, for example:

bis(3,5-diisopropyl-4-hydroxyphenyl)sulfone
bis(3-methyl-5-ethyl-4-hydroxyphenyl)sulfone
bis(3-chloro-3-hydroxyphenyl)sulfone
bis(3,5-dibromo-4-hydroxphenyl)sulfone
bis(3,5-dimethyl-4-hydroxyphenyl)sulfone
bis(3-methyl-4-hydroxyphenyl)sulfone
bis(4-hydroxyphenyl)sulfone.

Another group of dihydric phenols useful in the practice of the invention includes the dihydroxydiphenyls:

3,3'-5,5'-tetrabromo-4,4'-dihyroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl.

Another group of dihydric phenols which may be used in the practice of the invention includes the dihydric phenol ethers:

bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether
bis(4-hydroxyphenyl)ether.

A further group of dihydric phenols which may be used in the practice of the invention includes the dihydroxy benzenes, and the halo- and alkyl-substituted dihydroxy benzenes such as, for example, resorcinol, hydroquinone, 1,4-dihydroxy-2-chlorobenzene, 1,4-dihydroxy-2-bromo-benzene, 1,4-dihydroxy-2,3-dichlorobenzene, 1,4-dihydroxy-2-methylbenzene, 1,4-dihydroxy-2,3-dimethylbenzene, 1,4-dihydroxy-2-bromo-3-propylbenzene.

It is, of course, possible to employ a mixture of two or more different dihydric phenols in preparing the thermoplastic carbonate polymers of the invention.

The carbonate precursor employed in the process of this invention to prepare the linear thermoplastic polycarbonates is one of the carbonyl halides. Examples of the carbonyl halides are carbonyl bromide, carbonyl chloride, and carbonyl fluoride.

The following examples are presented to further illustrate but not limit the invention.

EXAMPLE I

Copolycarbonate of Bisphenol A (94.3 mole % and Epichlorohydrin-Bisphenol A adduct (5.7 mole %)

To a 2.0 liter flask equipped with stirrer, gas inlet tube, thermometer, and reflux condenser was added 228 gms (1.0 mole) of para bisphenol A and 750 gms of distilled water. With stirring, the contents was purged with nitrogen to remove the air and then 200 gms of 45% caustic was added, allowing 15 minutes of digestion time at 50° C. At this time, 5.0 gms (0.054 moles) of epichlorohydrin was added, and with continued stirring, 4.35 gms of tert-butyl phenol was added and digested for 1.0 hr. at 25° C. Five hundred ml of methylene chloride was added and after stirring for about 30 minutes at 25° C, 118 gms of gaseous phosgene was fed in at a rate of about 1.2 gms per minute. The reaction temperature of 25° C was maintained by using a cold water bath. The reactants were kept strongly alkaline during phosgenation by two additions of 22 gms of a 45% sodium hydroxide solution after 30 gms and 60 gms of phosgene had been added. Immediately after completion of phosgenation, the cooling water bath was removed and 1.5 ml of triethylamine was added. The contents were allowed to stir and digest for 2 hours. The salt water and excess caustic solution was decanted leaving the co-polycarbonate solution which was acidified with 16% by weight of HCl and washed with distilled water. The copolymer was precipitated in hexane as a white powder which was filtered, washed with water and vacuum dried.

The powdered co-polycarbonate, melting point 225°–235° C, gave a weight average molecular weight of 31,808 by gel permeation chromatography and when molded in a hand press at 450° F gave a very tough, transparent plastic sheet which was die cut to give test samples with the following properties at 73° F

| | |
|---|---|
| Yield Tensile Strength | 6,564 psi |
| Ultimate Tensile Strength | 7,775 |
| Yield Elongation | 5.0% |
| Heat Deflection Temperature 264 psi (unannealed) | 260° |
| Hardness, Shore D | 90 |

The infrared spectrum of the product was consistent with a random co-polycarbonate of bisphenol A and the epichlorohydrin-bisphenol A adduct, the latter being present at a concentration of 5.7 mole percent.

To determine the ease of processing (molding) of the above co-polycarbonate, 48.0 grams was charged to a Brabender Plasticorder (60 rpm using No. 5 roller blades) at a chamber temperature of 233° C. The torque recorded was 2400 meter-grams. For comparative purposes, the commercial homopolycarbonate of bisphenol A (Lexan 101) was similarly evaluated, giving a torque reading of 3050 meter-grams.

Injection molding evaluation was performed on the above co-polycarbonate (and also the commercial homopolycarbonate of bisphenol A for comparative purposes) with a Newbury Model HI3ORS injection molding machine, thus producing 6 inch test bars. The co-polycarbonate molded easily at 525° F and 10,500 psi. The commercial homopolycarbonate of bisphenol A (Lexan 101) could be molded at this temperature but it required 15,000 psi. This product exhibited splay marks due to moisture present during molding and also gave difficult mold release. Lexan 101 could be molded at 11,000 psi to give good moldings but required a temperature of 575° F. A different commercial homopolycarbonate of bisphenol A, (Lexan 141), advertised for ease of molding was molded at 11,000 psi but required 500° F for good molding.

The 6 inch test bars from all good moldings above were used for physical property evaluation. Tensile properties (ASTM D-638-68) were obtained at 73°, 150° and 250° F. Heat deflection (ASTM D-648-61) and notched Izod impact (ASTM D-256-70) were also determined. Values are as follows:

PROPERTIES OF INJECTION MOLDED LEXAN 101, LEXANE 141, AND EXAMPLE I CO-POLYCARBONATE AT 73° C

| Property | Lexan 101 | Lexan 141 | Example I Co-Poly-carbonate |
|---|---|---|---|
| Yield tensile strength, psi | 8,800 | 8,800 | 8,800 |
| Ultimate tensile strength, psi | 10,500 | 10,300 | 8,800 |
| Yield elongation, % | 6.0 | 3.5 | 5.9 |
| Ultimate elongation, % | 120 | 115 | 93 |
| Modulus of elasticity, psi | 387,000 | 356,000 | 379,000 |
| Izod impact strength ⅛ in. thick, ft.lbs./in. of notch | 17.2 | 16.4 | 16.0 |
| ¼ in. thick, ft.lbs./in. of notch compression molded | 2.0 | — | 1.5 |
| Deflection temp. 264 psi, unannealed, ° F | 262 | — | 254 |
| Deflection temp. 264 psi annealed ° F | 298 | 298 | 288 |

Tensile properties were obtained at a cross head speed of 0.2 inches per minute on an Instron Testing Machine using a gage length of 2 inches and a span of 4.5 inches. Elongation was measured with an extensometer to yield and with dividers between yield and ultimate.

| | 150° F | | 250° F | |
|---|---|---|---|---|
| Property | Lexan 101 | CoPoly-carbonate | Lexan 101 | CoPoly-carbonate |
| Yield tensile strength, psi | 6,800 | 7,000 | 4,900 | 5,200 |
| Yield elongation, % | 4.9 | 4.6 | 2.6 | 2.8 |
| Modulus, of elasticity, psi | 313,000 | 335,000 | 284,000 | 290,000 |

Moisture absorption was determined on samples of the above copolycarbonate and Lexan 101 which had been extruded through a Wayne 1 inch Extruder, granulated and dried at 250° F. The samples were placed in a constant humdity (50% R.H.) — constant temperature (75° F) room and weighed at various time intervals. The following results were obtained.

| | Moisture Absorption, Wt. % | |
|---|---|---|
| Time, Hr. | Lexan 101 | Co-polycarbonate |
| 5 | 0.68 | 0.54 |
| 20 | 1.08 | 0.91 |
| 65 | 1.40 | 1.15 |

EXAMPLE II

Copolycarbonate of Bisphenol A (89.0 mole %) and Epichlorohydrin-Bisphenol A Adduct (11.0 mole %)

To a 1.0 liter flask equipped with stirrer, gas inlet tube, thermometer, and reflux condenser was added 114 gms of para bisphenol A and 375 gms of distilled water. With stirring, the contents were purged with nitrogen to remove the air and then 95 gms of 45% caustic was added, allowing 60 minutes of digestion time at 50° C. At this time, 4.6 gms of epichlorohydrin was added and with continued stirring, 2.25 gms of tert-butyl phenol and 10 gms of 45% caustic were added and digested for 0.25 hr. at 250° C. 250 mls of methylene chloride was added and after stirring for about 30 minutes at 250° C., 59 gms of gaseous phosgene was fed in at a rate of about 1.2 gms per minute, maintaining a reaction temperature of 25°–30° C using a cold water bath. The reactants were kept strongly alkaline during phosgenation by two additions of 19 gms of a 45% sodium hydroxide solution after 30 gms and 60 gms of phosgene had had been added. Immediately after completion of phosgenation, the cooling water bath was removed and 0.75 mls of triethylamine was added and the contents were allowed to stir and digest for 2 hours. The salt water and excess caustic solution was decanted leaving the co-polycarbonate solution which was acifified with 16% by weight HCl and washed with distilled water. The copolymer was precipitated in hexane as a white powder which was filtered, washed with water and vacuum dried.

The resulting co-polycarbonate had a melting point of 225°–235° C and when molded in a hand press at about 500° F gave a very tough transparent plastic sheet which was die cut to give test samples with the following properties.

| Yield Tensile Strength | 6530 psi |
| Ultimate Tensile Strength | 7970 psi |
| Yield Elongation | 20% |
| Hardness Shore D | 70 |

EXAMPLE III

Copolycarbonate of Bisphenol A (74.6 mole %) and Epichlorohydrin-Bisphenol A Adduct (25.4 mole %)

To a 1.0 liter flask equipped with stirrer, gas inlet tube, thermometer, and reflux condenser was added 114 gms of para bisphenol A and 375 gms of distilled water. With stirring, the contents was purged with nitrogen to remove the air and then 95 gms of 45% aqueous caustic solution was added, allowing 60 minutes of digestion time at 30°–40° C. At this time 9.25 gms of epichlorohydrin was added, and with continued stirring, allowed to react 1 hour at 50°–55° C. With continued stirring, 3.25 gms of tert-butyl phenol and 10 gms of 45% caustic were added and digested for 0.25 hr. at 25° C. Two hundred fifty mls of methylene chloride was added and after stirring for about 15 minutes at 25° C, 59 gms of gaseous phosgene was fed in at a rate of about 1.2 gms per minute. During this time a reaction temperature of 25° C was maintained using a cold water bath. The reactants were kept strongly alkaline during phosgenation by adding additional caustic, 19 gms 45% aqueous sodium hydroxide, after 30 gms and 60 gms of phosgene had been added. Immediately after completion of phosgenation, the cooling water bath was removed and 0.75 ml of triethylamine was added. The contents were allowed to stir and digest for two hours. The salt water and excess caustic solution was decanted leaving the copolycarbonate solution which was acidified with 16% by weight HCl and washed with distilled water. The copolymer was precipitated in hexane as a white powder which was filtered, washed with water and vacuum dried.

The resulting copolycarbonate had a melting point of 230°–240° C and a weight average molecular weight of 42,718 by GPC. The infrared spectrum showed the presence of about 25 mole percent repeating polycarbonate units of the epichlorohydrin-bisphenol A adduct. When molded in a hand press at about 500° F the polymer gave a very tough transparent plastic sheet which was die cut to give test samples with the following properties.

| Yield Tensile Strength | 6565 psi |
| Ultimate Tensile Strength | 8250 psi |
| Yield Elongation | 9% |
| Hardness Shore D | 70 |

EXAMPLE IV

Copolycarbonate of Bisphenol A (51.2 mole %) and Epichlorohydrin-Bisphenol A Adduct (48.8 mole %)

To a two liter flask equipped with a stirrer, reflux condenser, thermometer, and gas inlet tube was added 228 gms para bisphenol and 750 mls of distilled water. The contents were purged with nitrogen through the dip tube for 15 minutes to remove the air and, with continued stirring 200 gms of 45% sodium hydroxide was added. The mixture was cooled 50 30° C at which point 30 gms of epichlorohydrin was added and digested for 5 hours at 30°–33° C, keeping a slight nitrogen purge during the reaction. An amount of 1.5 grams of tert-butyl phenol and 22 grams of 45% sodium hydroxide were added and continued stirring for 30 minutes at 25°–28° C; then 600 mls of methylene chloride was added and the contents stirred for about 1½ hours at 25° C until the mixture became lump free and homogeneous. One hundred grams of phosgene gas was bubbled into the reaction mixture at a rate of about 1.3 grams per minute while maintaining a reaction temperature of 25° C by using a cold water bath. After the phosgenation was completed, the water bath was removed and 1½ mls of triethylamine was added and with continued stirring, the contents were digested for 45 minutes. During this period the contents exothermed from 25° to 30° C and the contents became very viscous. The stirrer was stopped and about 50% of the water layer was removed and 300 mls of methylene chloride was added and the mixture allowed to stir for an additional 1½ hours at 27° C.

The solution of copolycarbonate in methylene chloride was separated from the water phase, washed with dilute HCl and then with water. The polymer precipitated in hexane and washed with hot water until essentially free of the chloride ion, and dried in a vacuum over for 24 hours at 110° C.

The copolycarbonate, melting point 225°–235° C, gave a weight average molecular weight of 136, 169 by gel permeation chromatography.

A ⅛ inch film was molded in a hand press at 570° F resulting in a tough, clear plastic.

What we claim is:

1. A linear thermoplastic polycarbonate which comprises a reaction product under polycarbonate forming conditions of
   (1) a carbonate precursor,
   (2) a dihydric phenol,
   (3) about 50 to about 2 mole percent of hydroxyl compounds having the formula HO—Z$-$[O—CH$_2$CH(OH)—CH$_2$—O—Z$-$]$_n$ OH, and
   (4) a catalytic quantity of a catalyst selected from the group consisting of quaternary amines and tertiary amines wherein Z is the divalent residue from a dihydric phenol and $n$ is a number having an average value from 1–5 wherein the polycarbonate has a weight average molecular weight greater than about 25,000 as determined by gel permeation chromatography.

2. The polycarbonate as set forth in claim 1 having a molecular weight range from about 30,000 to about 160,000.

3. A linear thermoplastic polycarbonate which comprises the reaction product under polycarbonate forming conditions of
(1) phosgene,
(2) HO—Z—OH,
(3) about 50 to about 2 mole percent of hydroxyl compounds having the formula HO—Z$+$O—CH$_2$CH(OH)—CH$_2$—O—Z$+_n$ OH, and
(4) a catalytic quantity of a catalyst selected from the group consisting of quaternary amines and tertiary amines wherein Z is the divalent group

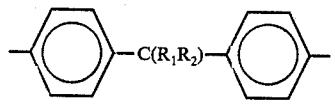

and R$_1$R$_2$ are independently hydrogen and lower alkyl groups and $n$ is a number having an average value of 1-5 wherein the polycarbonate has a weight average molecular weight greater than about 25,000.

4. The polycarbonate as set forth in claim 3 having a molecular weight range from about 30,000 to about 160,000.

5. A linear thermoplastic polycarbonate comprising from about 50 to about 98 mole percent of divalent units having the designation —Z —, randomly connected by carbonate linkages with about 50 to about 2 mole percent of hydroxy units having the formula

wherein Z is the divalent residue from a dihydric phenol and $n$ is a number having an average value of 1-5 wherein the polycarbonate has a weight average molecular weight greater than about 25,000.

6. A linear thermoplastic polycarbonate comprising from about 50 to about 98 mole percent of divalent units having the designation —Z — randomly connected by carbonate linkages with about 50 to about 2 mole percent of divalent hydroxy units having the formula

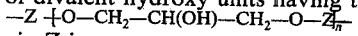

wherein Z is

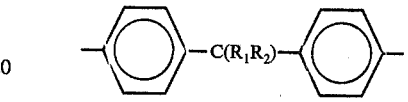

R$_1$ and R$_2$ are independently hydrogen and lower alkyl groups and $n$ is a number having an average value of 15 wherein the polycarbonate has a weight average molecular weight greater than about 25,000.

7. A polycarbonate as claimed in claim 6 comprising from about 70 to about 90 mole percent Z units and about 30 to about 10 mole percent divalent hydroxy units.

* * * * *